United States Patent
Shimizu

[11] Patent Number: 5,956,169
[45] Date of Patent: Sep. 21, 1999

[54] BIDIRECTIONAL OPTICAL BURST TRANSMISSION

[75] Inventor: Kazuyoshi Shimizu, Kawasaki, Japan

[73] Assignee: Fujitsu Limited, Kanagawa, Japan

[21] Appl. No.: 08/677,633

[22] Filed: Jul. 8, 1996

[30] Foreign Application Priority Data

Jul. 6, 1995 [JP] Japan ..................................... 7-170642

[51] Int. Cl.⁶ .................................................. H04B 10/00
[52] U.S. Cl. ........................... 359/167; 359/113; 359/158
[58] Field of Search ..................................... 359/113, 158, 359/162, 167, 169–170, 173, 179, 188, 195, 135

[56] References Cited

U.S. PATENT DOCUMENTS

| 5,153,764 | 10/1992 | Faulkner et al. | 359/167 |
| 5,317,441 | 5/1994 | Sidman | 359/113 |
| 5,434,668 | 7/1995 | Wootton et al. | 359/170 |

FOREIGN PATENT DOCUMENTS

| 59-58934 | 4/1984 | Japan . |
| 1-208928 | 8/1989 | Japan . |

*Primary Examiner*—Kinfe-Michael Negash
*Attorney, Agent, or Firm*—Helfgott & Karas, P.C.

[57] ABSTRACT

In bidirectional optical burst transmission using a single optical fiber, a signal is reliably discriminated even if reflected light is contained in a received optical signal. According to a first aspect of the invention, the received signal converted into an electrical signal is compared with a prescribed reference voltage, thereby generating a signal light identification voltage output for identifying the beginning of the signal light. According to a second aspect of the invention, a peak value and a bottom value of the received signal are held with respectively prescribed time constants, and a voltage intermediate between them is generated as a voltage output used to discriminate the signal light. According to a third object of the invention, the waveform only of the reflected light is detected and stored, and a signal light voltage output with the reflected light suppressed is generated by subtracting the stored waveform from the received signal.

18 Claims, 18 Drawing Sheets

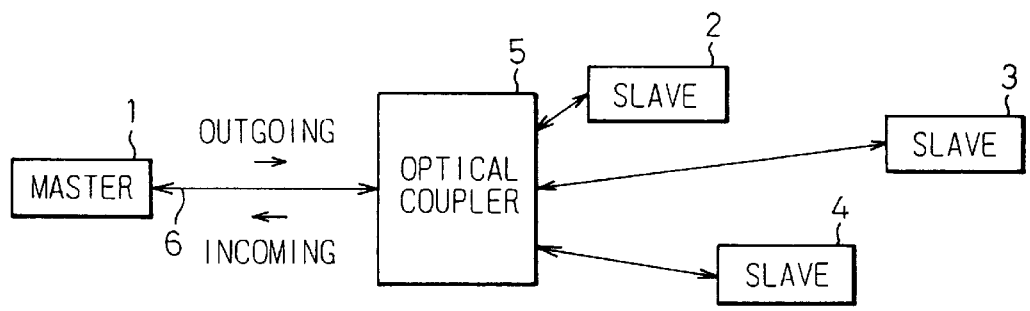
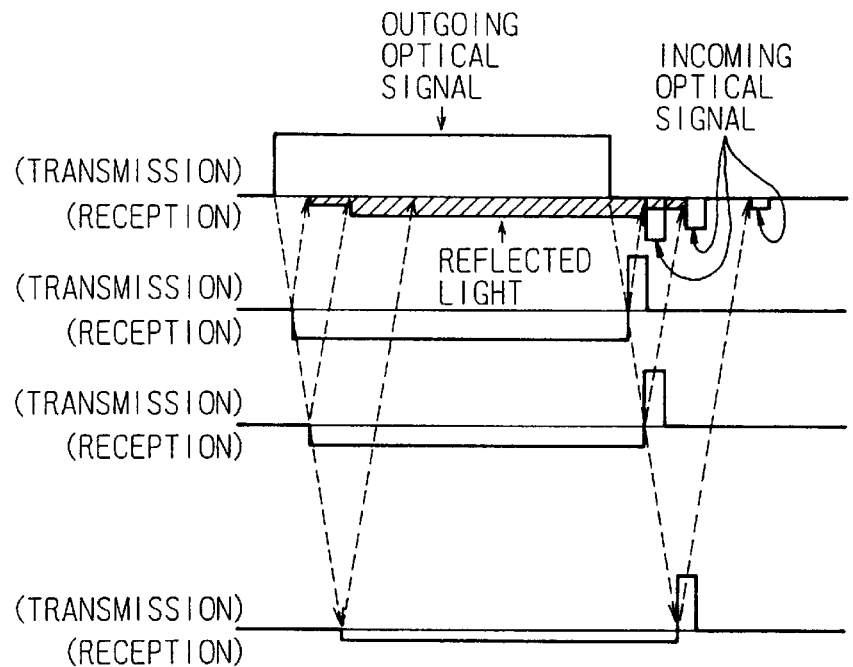

SIGNAL INPUT
WAVEFORM

PEAK DETECTION
OUTPUT WAVEFORM

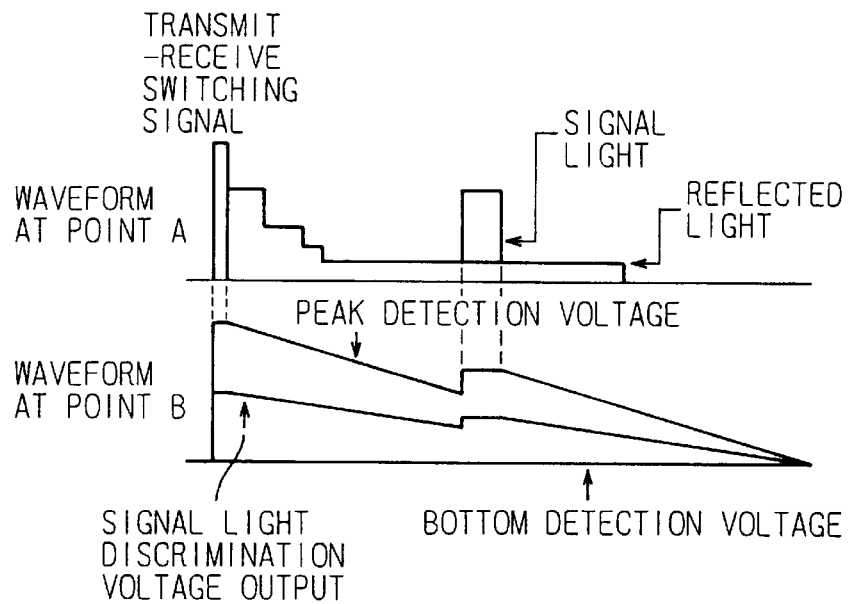
Fig.14A
Fig.14B
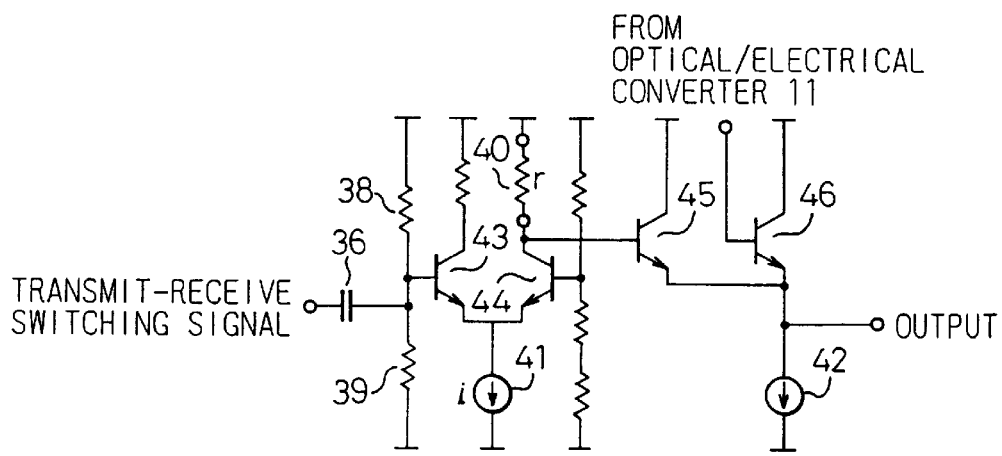
Fig.15

Fig.16A TRANSMIT-RECEIVE SWITCHING SIGNAL

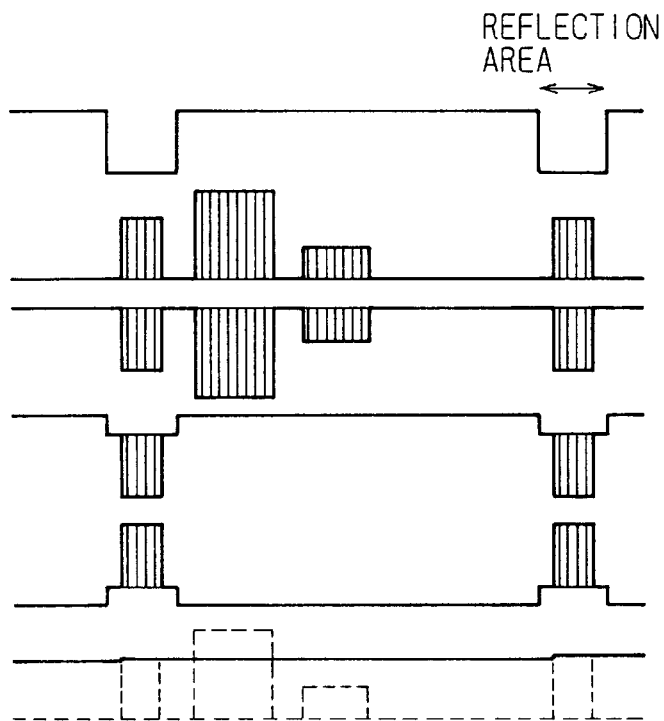
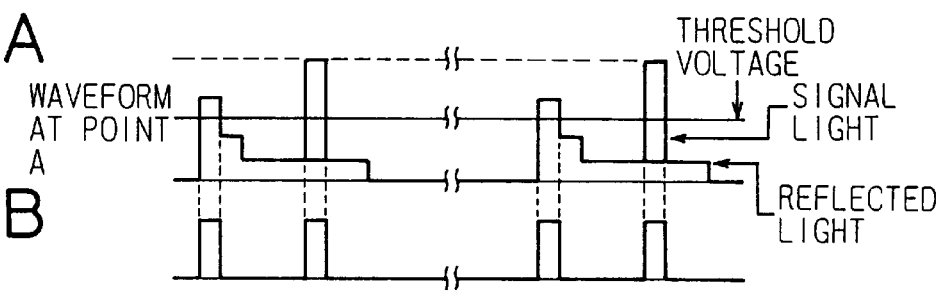

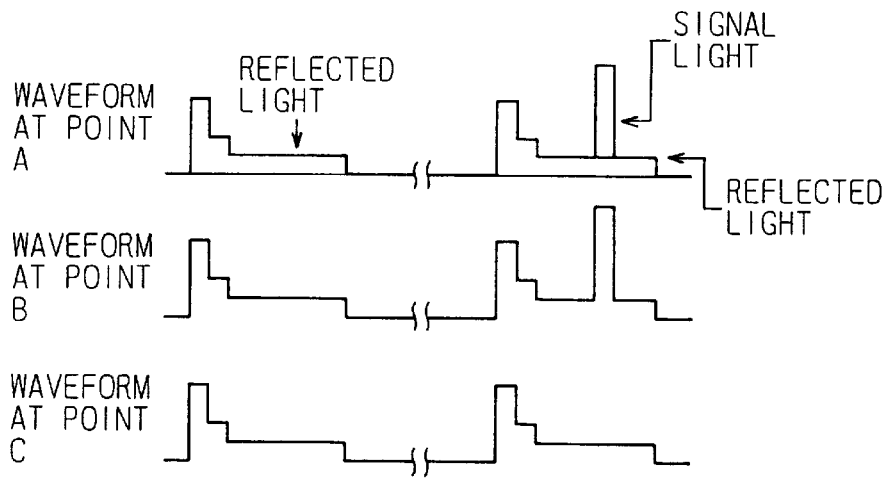
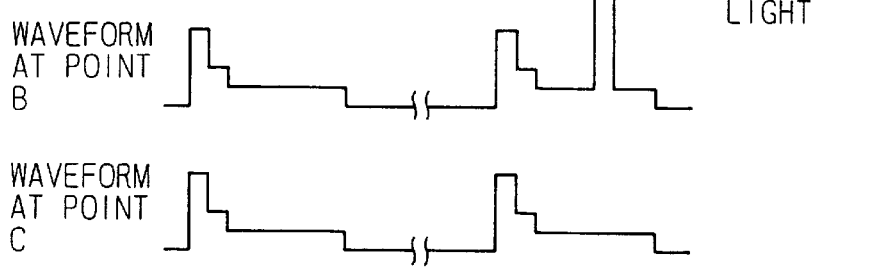
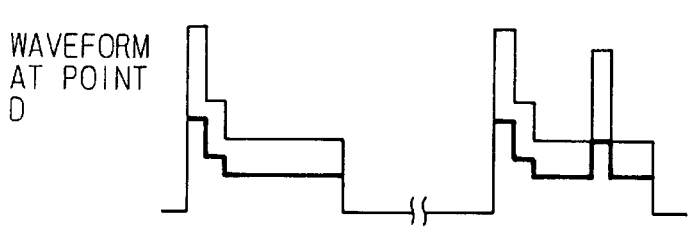
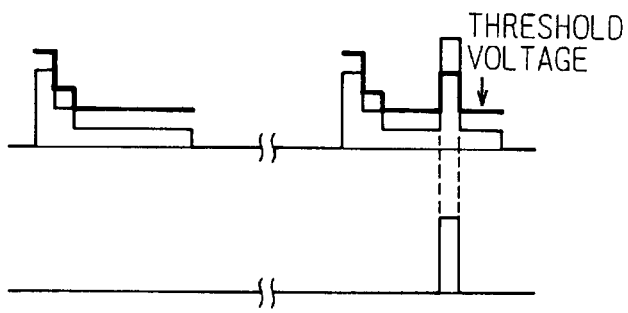

BIDIRECTIONAL OPTICAL BURST TRANSMISSION

BACKGROUND OF THE INVENTION

1. Field of the Invention

The present invention relates to bidirectional optical burst transmission through an optical fiber and, more particularly, to a signal discrimination method and apparatus for ensuring reliable discrimination of signal light in optical burst transmission even when reflected light and signal light occur close to each other or are superimposed one on top of the other.

2. Description of the Related Art

In recent years, due to an ever increasing amount of information transmission, the need for inexpensive optical transmission systems has been increasing, particularly in the case of subscriber optical transmission systems. Under these circumstances, there have been developed systems for performing bidirectional optical burst transmission using a single optical fiber and bidirectional optical burst transmission systems for one-to-many bidirectional communication.

In such bidirectional optical burst transmission, if reflected light that returns immediately after the transmission of an optical signal occurs close to the signal light transmitted from the other station, or is superimposed on it, it may become difficult to discriminate the signal light since the reflected light and the signal light are received as continuous data. This problem can occur even in wavelength-division multiplexed transmission where different transmission wavelengths are assigned to different stations, if the separation between different wavelengths is not sufficient.

To prevent overlapping or collision between reflected light and signal light, it has been commonly practiced to suppress the reflected light below the receivable level or to provide a reflection guard time for eliminating the interference between the reflected light and the signal light.

To suppress reflected light, the level of the reflected light needs to be suppressed below the light OFF detection level, which necessitates decreasing the reflected light level by applying advanced physical contact (APC) or angled polishing to fiber ends in an optical connector, or raising the light OFF detection level though this degrades the reception level. This necessarily leads to a cost increase and performance degradation.

On the other hand, the guard time method involves the problem of degrading information transmission efficiency since signal transmission cannot be performed during the guard time.

SUMMARY OF THE INVENTION

The present invention has been devised to overcome the above-outlined problems with the prior art, and it is an object of the invention to provide a signal discrimination method and apparatus capable of achieving reliable discrimination of signal light in bidirectional optical burst transmission without having to suppress reflected light or to provide a reflection guard time.

According to the present invention, there is provided, in bidirectional optical burst transmission performed between a master station and at least one slave station using a single optical fiber, a method of generating a signal light identification voltage output that signifies the beginning of signal light transmitted from the slave station and that is used to identify the signal light, the signal light being included in a received optical signal that is received at the master station and that contains a reflection of an optical signal sent out from the master station comprising the steps of: converting the received optical signal into a received electrical signal; and comparing the received electrical signal with a prescribed reference voltage to generate the signal light identification voltage output.

According to the present invention, there is also provided, in bidirectional optical burst transmission performed between a master station and at least one slave station using a single optical fiber, a method of generating a signal light discrimination voltage output for discriminating signal light, transmitted from the slave station, the signal light being included in a received optical signal that is received at the master station and that contains a reflection of an optical signal sent out from the master station, comprising the steps of: converting the received optical signal into a received electrical signal; holding a peak value voltage of the received electrical signal with a first time constant; holding a bottom value voltage of the received electrical signal with a second time constant; and generating, from the peak value voltage and the bottom value voltage, a voltage intermediate therebetween as the signal light discrimination voltage output.

According to the present invention, there is also provided, in bidirectional optical burst transmission performed between a master station and at least one slave station using a single optical fiber, a method of generating a signal light voltage output with reflected light suppressed in order to identify signal light, transmitted from the slave station, the signal light being included in a received optical signal that is received at the master station and that contains a reflection of an optical signal sent out from the master station, comprising the steps of: converting the received optical signal into a received electrical signal; detecting a waveform only of the reflected light from the received electrical signal and storing the waveform; and generating the signal light voltage output with reflected light suppressed, by subtracting the stored waveform of the reflected light from the received electrical signal.

According to the present invention, there is also provided, in bidirectional optical burst transmission performed between a master station and at least one slave station using a single optical fiber, an apparatus for generating a signal light identification voltage output that signifies the beginning of signal light transmitted from the slave station and that is used to identify the signal light, the signal light being included in a received optical signal that is received at the master station and that contains a reflection of an optical signal sent out from the master station, comprising: an optical-to-electrical converter for converting the received optical signal into a received electrical signal; and a comparator for comparing the received electrical signal with a prescribed reference voltage, to generate the signal light identification voltage output.

According to the present invention, there is also provided, in bidirectional optical burst transmission performed between a master station and at least one slave station using a single optical fiber, an apparatus for generating a signal light discrimination voltage output for discriminating signal light transmitted from the slave station, the signal light being included in a received optical signal that is received at the master station and that contains a reflection of an optical signal sent out from the master station, comprising: an optical-to-electrical converter for converting the received optical signal into a received electrical signal; a peak detector for holding a peak value voltage of the received electrical signal with a first time constant; a bottom detector for holding a bottom value voltage of the received electrical signal with a second time constant; and a voltage dividing circuit for generating, from the peak value voltage and the bottom value voltage, a voltage intermediate therebetween as the signal light discrimination voltage output.

According to the present invention, there is also provided, in bidirectional optical burst transmission performed between a master station and at least one slave station using a single optical fiber, an apparatus for generating a signal light voltage with reflected light suppressed in order to identify signal light transmitted from the slave station, the signal light being included in a received optical signal that is received at the master station and that contains a reflection of an optical signal sent out from the master station, comprising: an optical-to-electrical converter for converting the received optical signal into a received electrical signal; a reflection waveform storing section for detecting a waveform only of the reflected light from the received electrical signal, and for storing the waveform; and a subtractor for generating the signal light voltage output with reflected light suppressed, by subtracting the stored waveform of the reflected light from the received electrical signal.

BRIEF DESCRIPTION OF THE DRAWINGS

FIG. 1 is a block diagram showing a bidirectional optical burst transmission system;

FIGS. 2A to 2D are waveform diagrams of transmitted and received signals for each station;

FIGS. 14A and 14B are waveform diagrams for signals at designated points in FIG. 13;

FIG. 15 is a circuit diagram showing a detailed configurational example of a peak detection forceful charge voltage adder;

FIGS. 16A and 16B are waveform diagrams for explaining the operation of the circuit of FIG. 15;

FIGS. 20A to 20F are waveform diagrams for signals at designated points in FIG. 19;

FIGS. 21A and 21B are waveform diagrams for signals at designated points in FIG. 18;

FIGS. 23A to 23F are waveform diagrams for signals at designated points in FIG. 22;

DESCRIPTION OF THE PREFERRED EMBODIMENTS

FIG. 1 and FIGS. 2A–2D show an example of a bidirectional optical burst transmission system and its transmitted and received signals. FIG. 1 shows the system configuration, and FIGS. 2A–2D show signals transferred between a master station 1 and respective slave stations 2–4, the upper part of each figure showing an optical signal transmitted to each station and the lower part an optical signal received from each station.

In the bidirectional optical burst transmission system, the master station 1 is connected to the slave stations 2–4 via an optical coupler 5 through an optical fiber 6, and a communication is performed between the master station 1 and each slave station, with the master station 1 transmitting an optical signal (outgoing signal) and the slave station responding to it with an optical signal (incoming signal).

The outgoing optical signal transmitted from the master station 1 is received by the destination slave station after a delay time corresponding to the distance between them. FIGS. 2B–2D show the signals transmitted to and received from the slave stations 2–4, where it is assumed that the incoming optical signal from each slave station is sent out from the slave station immediately after it has completed the reception of the outgoing optical signal.

At this time, some of the outgoing optical signal is reflected back to the master station 1 from the slave station, as shown by hatching in FIG. 2A, so that the master station 1 receives signal light with the reflected light from the slave station superimposed thereon with a certain delay time; furthermore, signal light carrying an incoming optical signal from each slave station is superimposed on top of that.

In this way, in bidirectional optical burst transmission, the master station receives a portion of its transmitted optical signal in the form of reflected light superimposed on signal light carrying an incoming optical signal from each slave station, and the master station cannot receive them with one discriminated from the other.

Figure 3:
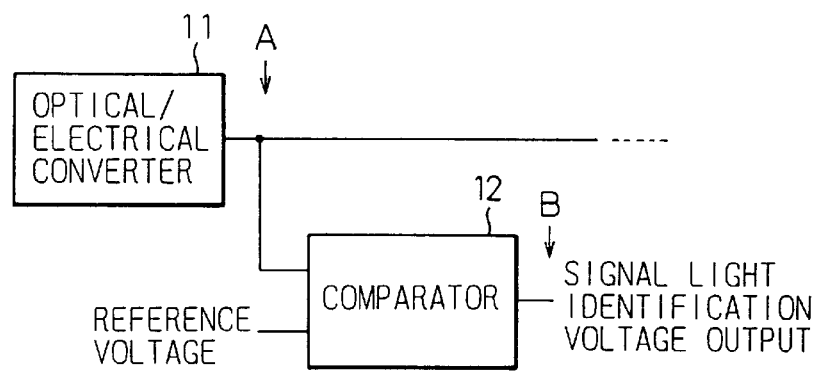
FIG. 3 is a block diagram showing a first embodiment of the present invention.
Figure 4A:
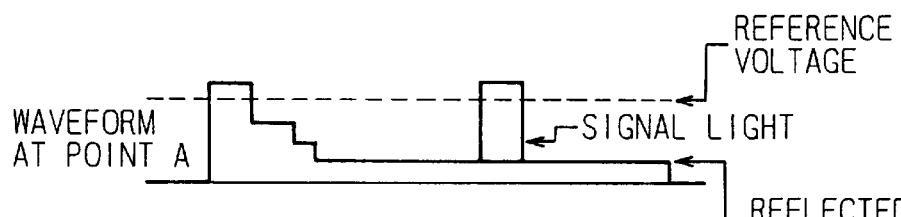
FIGS. 4A and 4B are waveform diagrams for signals at designated points in FIG. 3.
Figure 4B:
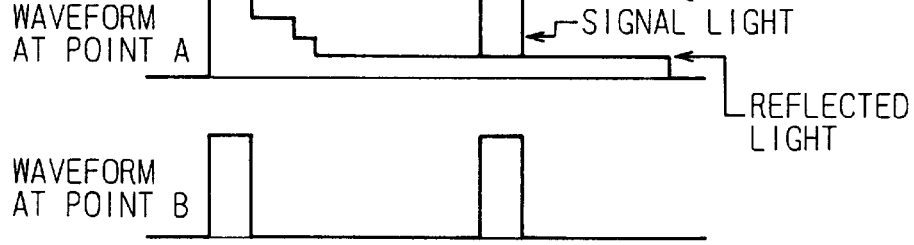

FIG. 3 and FIGS. 4A and 4B concern a first embodiment of the present invention. FIG. 3 shows the configuration of a signal light identification voltage generator in a receiver circuit at the master station, and FIGS. 4A and 4B show signal waveforms at designated points in the signal light identification voltage generator. In the figure, a signal light identification voltage output is a pulse for identifying the beginning of signal light that follows reflected light.

In FIG. 3, reference numeral 11 designates an optical-to-electrical converter, formed from a known optical detector or the like, for converting an input optical signal into an electrical signal. Reference numeral 12 indicates a comparator, formed from a known comparator circuit or the like, for comparing an electrical signal input with a reference voltage, and for producing a prescribed output for an input exceeding the reference voltage.

The comparator 12 compares an output signal of the optical-to-electrical converter 11 with a prescribed reference voltage, and produces a signal light identification voltage output at point B for an input of a level exceeding the reference voltage.

The waveform at point A, representing the output of the optical-to-electrical converter 11, contains reflected light superimposed on signal light. If the output level of the incoming optical signal from each slave station is set so that the signal light gives a higher level than its adjacent reflected light, the signal light identification voltage output can be made to occur only for the signal light. This signal light identification voltage output is used, for example, as a trigger for the rising of a clock pulse in a clock regenerator (FIG. 28 to be described later) which generates a clock pulse for signal discrimination in the receiver at the subsequent stage.

Figures 5, 6B, 6C:
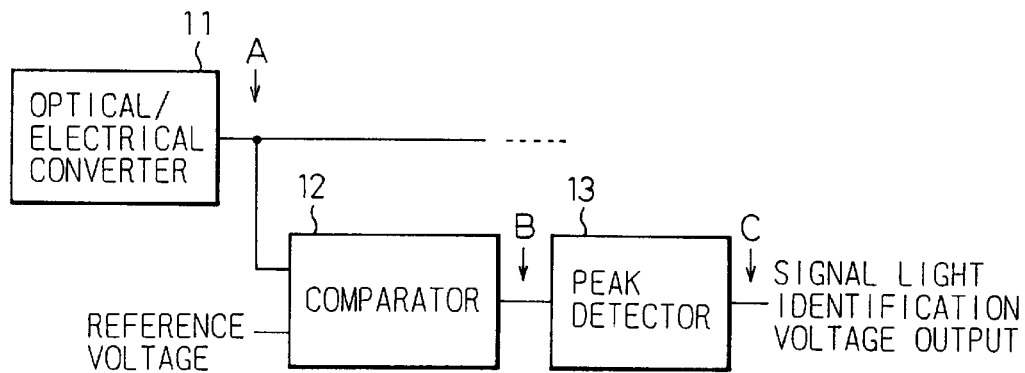
FIG. 5 is a block diagram showing a second embodiment of the present invention.
FIGS. 6A, 6B, and 6C are waveform diagrams for signals at designated points in FIG. 5.
Figure 6A:
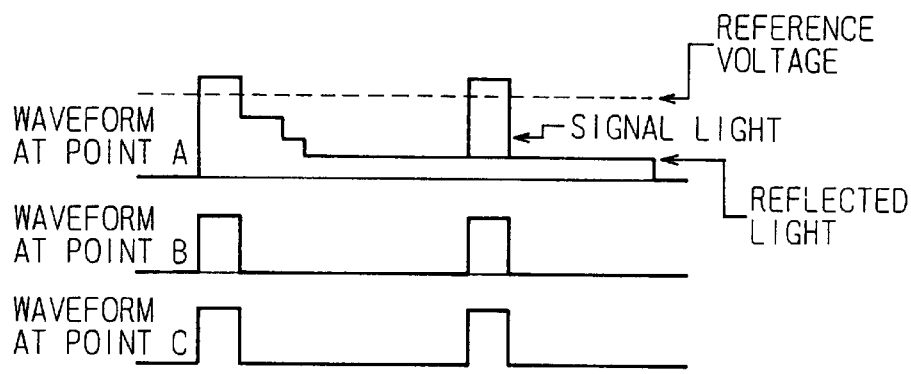

FIG. 5 and FIGS. 6A–6C concern a second embodiment of the present invention. FIG. 5 shows the configuration of a signal light identification voltage generator in a receiver circuit at the master station, and FIGS. 6A–6C show signal waveforms at designated points in the signal light identification voltage generator. In the figure, the same parts as those in FIG. 3 are designated by the same reference numerals, whereas reference numeral 13 designates a peak detector for detecting and holding a peak voltage of an input signal.

The comparator 12 compares an output signal of the optical-to-electrical converter 11 with a prescribed reference voltage, and produces an output signal at point B for an input of a level exceeding the reference voltage. The peak detector 13 detects and holds a peak voltage of the output signal of the comparator 12, and produces a signal light identification voltage output at point C.

Figure 7:
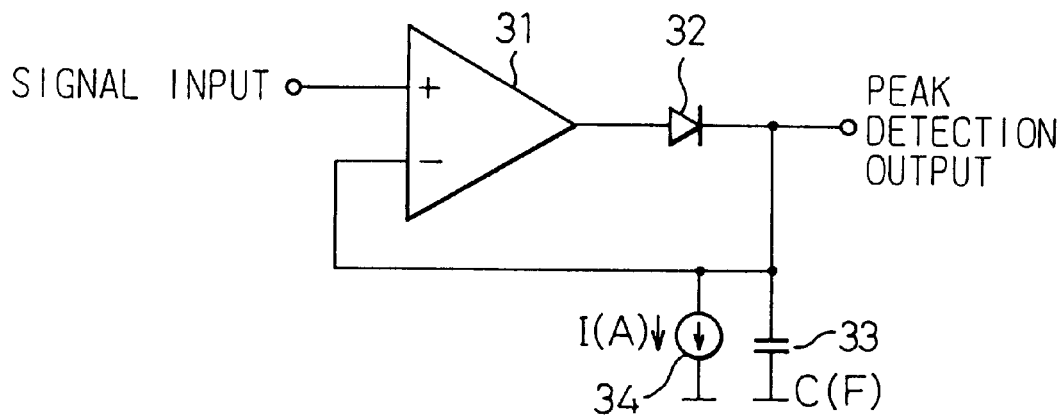
FIG. 7 is a circuit diagram showing a detailed configurational example of a peak detector.

FIG. 7 shows a configurational example of the peak detector 13. In FIG. 7, 31 is an operational amplifier, 32 is a diode, 33 is a capacitor (capacitance C(F)), and 34 is a current source (current I(A)).

Figure 8A:
FIGS. 8A and 8B are waveform diagrams for explaining the operation of the circuit of FIG. 7.
Figure 8B:

The waveform of the signal input from the optical-to-electrical converter 11 is, as shown in FIG. 8A, a combination of 1s and 0s corresponding to transmitted data. When a peak voltage corresponding to a 1 is input, the operational amplifier 31 charges the capacitor 33 through the diode 32 until the voltage on the capacitor 33 becomes equal to the peak voltage. The voltage on the capacitor 33 is then discharged for a discharge time T (=C/I(s/V)) according to the current I(A) from the current source 34, thereby producing a peak detection output at a plate of the capacitor 33. Therefore, as shown in FIG. 8B, the peak detection output is a smoothed signal corresponding to the envelope waveform of the signal input.

In the second embodiment, since the peak detector 13 is added at the output of the comparator 12, the signal light identification voltage output has a simple waveform; this facilitates processing when generating a clock pulse for signal discrimination in the receiver at the subsequent stage.

Figure 9:
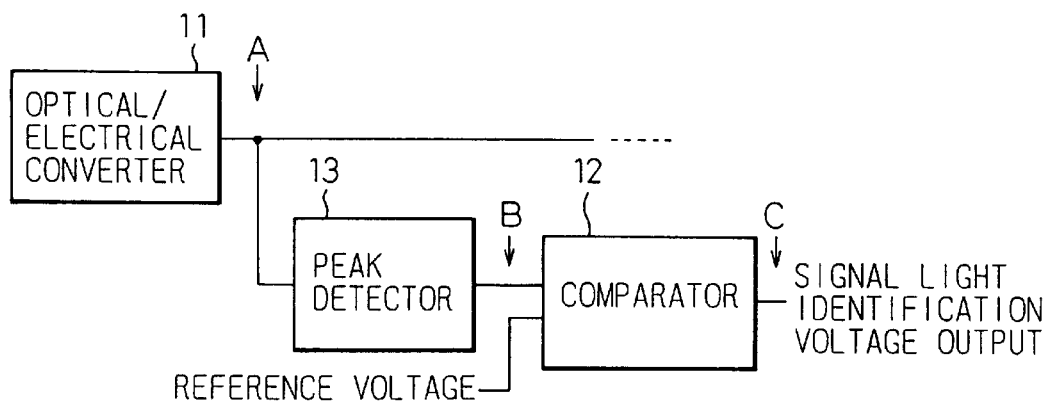
FIG. 9 is a block diagram showing a third embodiment of the present invention.

FIG. 9 shows a circuit configuration according to a third embodiment of the present invention. In the figure, the same parts as those in FIG. 5 are designated by the same reference numerals; the only difference from FIG. 5 is that the peak detector 13 and the comparator 12 are arranged in reverse order.

Figure 10A:
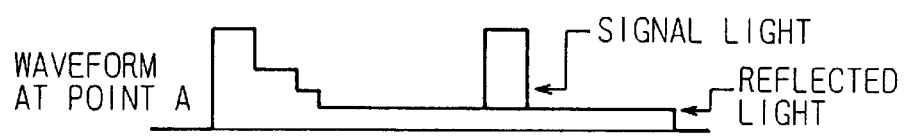
FIGS. 10A to 10C are waveform diagrams for signals at designated points in FIG. 9.
Figure 10B:
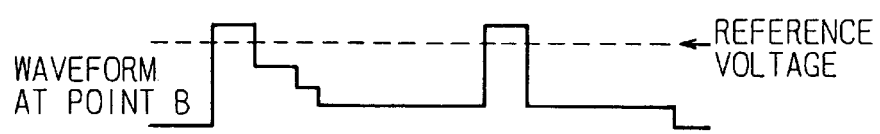
Figure 10C:

The peak detector 13 detects and hold a peak voltage of an output signal, such as the one shown in FIG. 10A, output at point A from the optical-to-electrical converter 11. The comparator 12 compares an output signal, such as the one shown in FIG. 10B, output at point B from the peak detector 13 with a prescribed reference voltage, and produces at point C a signal light identification voltage, such as the one shown in FIG. 10C, for an input of a level exceeding the reference voltage.

Figure 11:
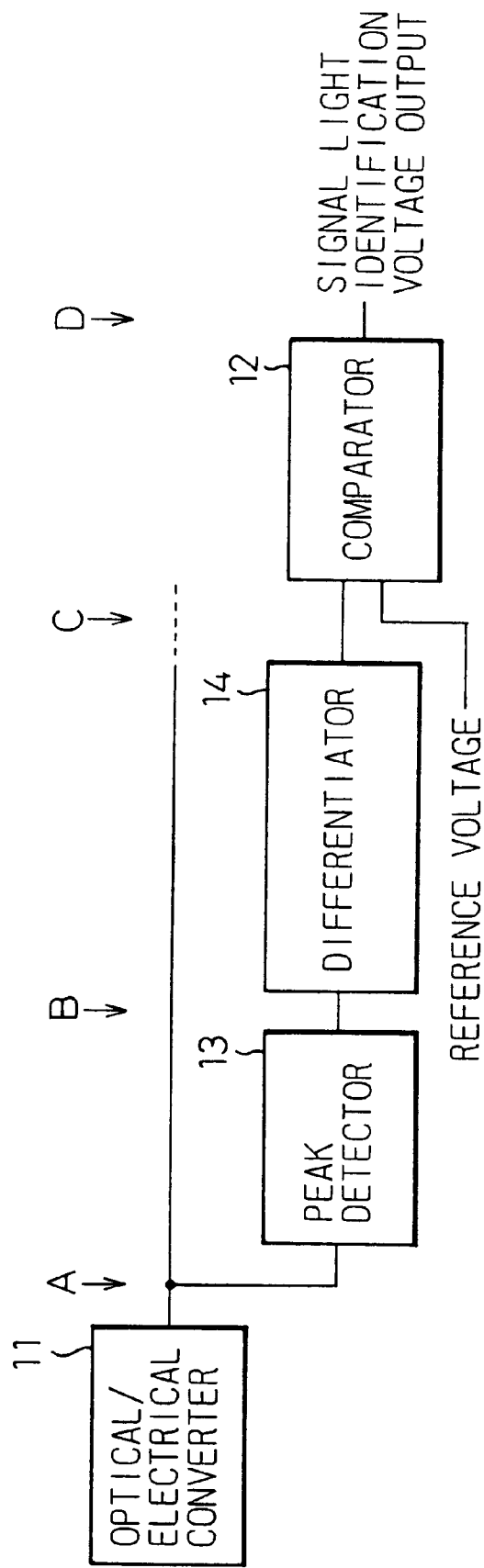
FIG. 11 is a block diagram showing a fourth embodiment of the present invention.

FIG. 11 shows a circuit configuration according to a fourth embodiment of the present invention. In the figure, the same parts as those in FIG. 9 are designated by the same reference numerals, whereas reference numeral 14 is a differentiator, of a known configuration, for producing an output by differentiating the input signal.

Figure 12:
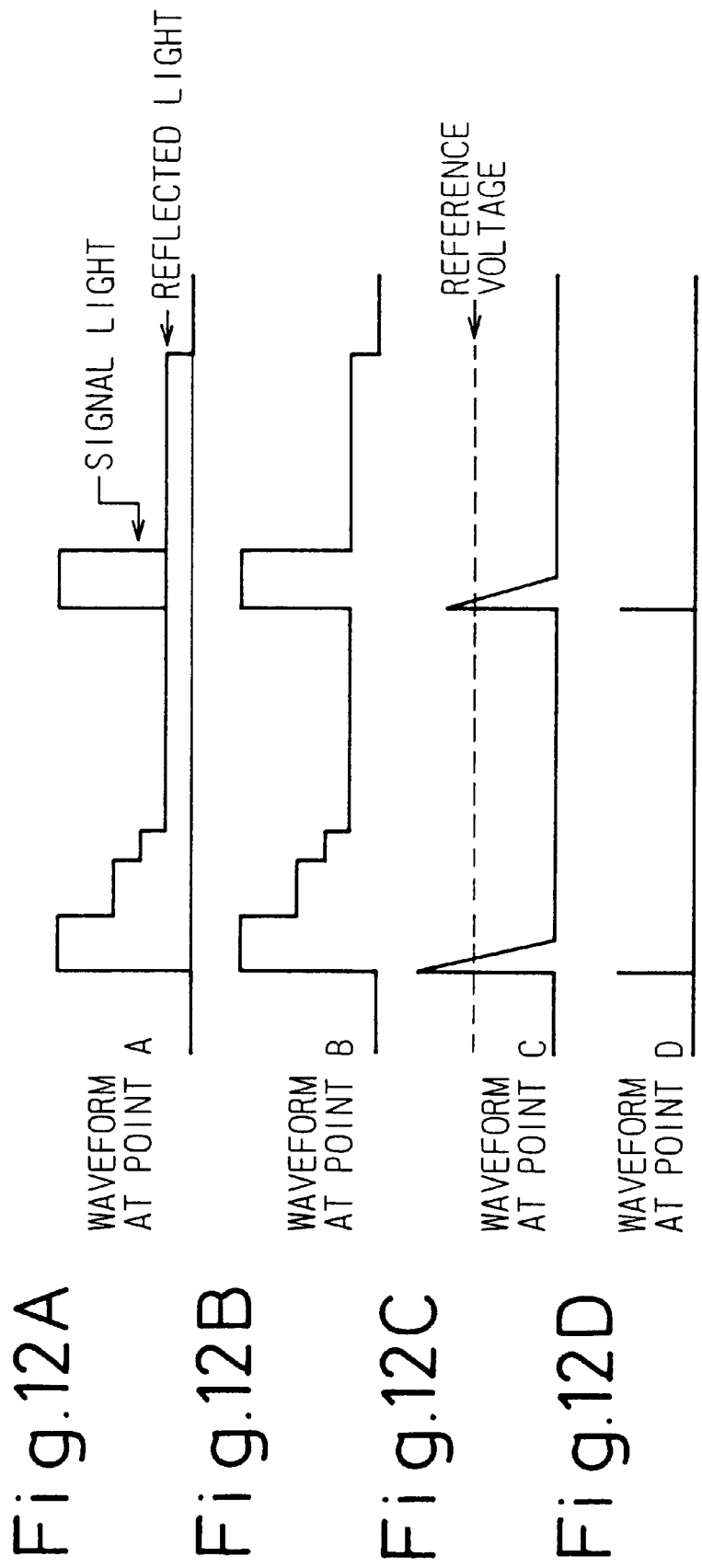
FIGS. 12A to 12D are waveform diagrams for signals at designated points in FIG. 11.

The peak detector 13 detects and hold a peak voltage of an output voltage, such as the one shown in FIG. 12A, output at point A from the optical-to-electrical converter 11. The differentiator 14 produces an output by differentiating an output signal, such as the one shown in FIG. 12B, output at point B from the peak detector 13. The comparator 12 compares an output signal, such as the one shown in FIG. 12C, output at point C from the peak detector 13 with a prescribed reference voltage, and produces at point D a signal light identification voltage output, such as the one shown in FIG. 12D, for an input of a level exceeding the reference voltage. The signal light identification voltage output in this case is produced as a pulse corresponding to the rising of a received optical signal; this ensures correct clock rising when generating a clock pulse for signal discrimination in the receiver at the subsequent stage.

Figure 13:
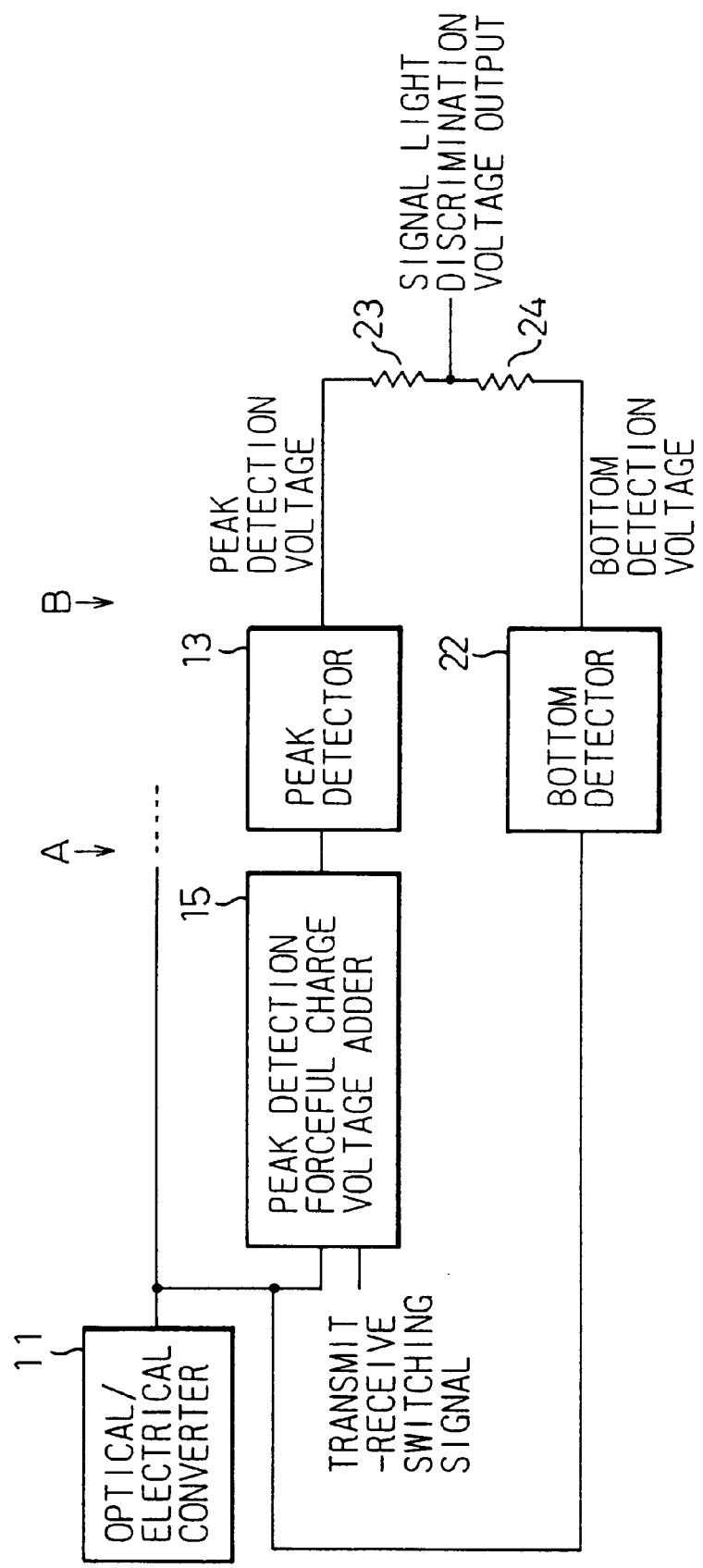
FIG. 13 is a block diagram showing a fifth embodiment of the present invention.

FIG. 13 shows a circuit configuration according to a fifth embodiment of the present invention. In the figure, the same parts as those in FIG. 5 are designated by the same reference numerals. Reference numeral 15 is a peak detection forceful charge voltage adder which, by using a transmit-receive switching signal signifying switching from a transmitting state to a receiving state at the master station 1, generates a pulse of a prescribed amplitude, and adds it to the output signal of the optical-to-electrical converter 11 for output.

The peak detector 13 detects and holds a peak voltage of an output signal, such as the one shown in FIG. 14A, output from the peak detection forceful charge voltage adder 15, and discharges it with a prescribed time constant, outputting at point B a peak detection voltage as shown in FIG. 14B. A bottom detector 22 detects a bottom value of the output signal of the optical-to-electrical converter 11, holds it with a sufficiently long prescribed time constant, and outputs a bottom detection voltage as shown in FIG. 14B. The output of the peak detector 13 and the output of the bottom detector 22 are connected through a series connection of resistors 23 and 24, so that a signal light discrimination voltage output, having a potential intermediate between the peak detection potential and the bottom detection potential, as shown in FIG. 14B, is obtained at the node between them. Here, the signal light discrimination voltage output refers to a threshold voltage by which a level of signal light is discriminated between a high level (H) and a low level (L).

FIG. 15 shows a configurational example of the peak detection forceful charge voltage adder 15. In FIG. 15, 36 is a capacitor, 38–40 are resistors, 41 and 42 are constant current sources, and 43–46 are transistors.

Figure 16B:
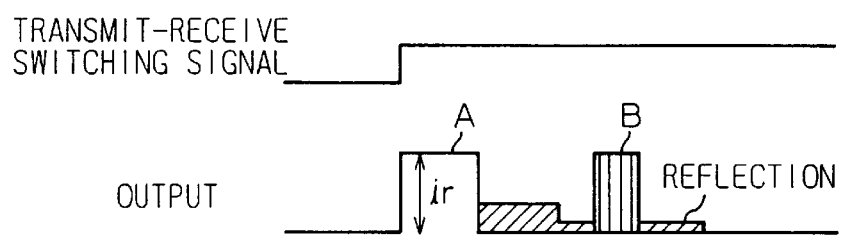

The capacitor 36 and the resistors 38, 39 constitute a differentiating circuit which differentiates the transmit-receive switching signal shown in FIG. 16A. When the differentiated output signal is input to a differential amplifier circuit comprising the constant current source 41 and transistors 43, 44, a corresponding current i from the constant current source 41 flows through the load resistor 40 (resistance value r), and a charge voltage ir (for the peak detector 13), shown by A in FIG. 16B, appears at the emitter of the transistor 45. The output from the optical-to-electrical converter 11, shown by B in the figure, passes through the transistor 46 and is combined with the charge voltage ir for output (FIG. 16B).

Figure 17:
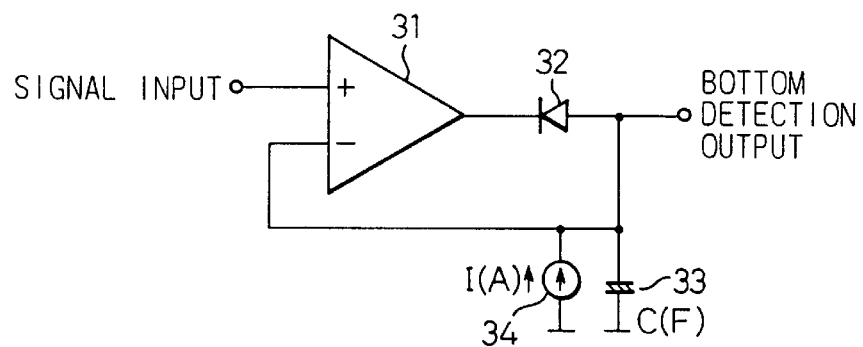
FIG. 17 is a circuit diagram showing a detailed configurational example of a bottom detector.

FIG. 17 shows a configurational example of the bottom detector 22. The same parts as those in FIG. 7 are designated by the same reference numerals. The difference from the peak detector shown in FIG. 7 is the orientation of the diode 32 and current source 34.

In the fifth embodiment, with the provision of the peak detection forceful charge voltage adder 15, the master station 1 generates a peak detection forceful charge voltage in synchronism with a transmit-to-receive switching operation and adds it to the output of the optical-to-electrical converter 11. A threshold voltage that decreases with a prescribed time constant is generated by the peak detector 13 as shown in FIG. 14B; since reflected light decays with time, this ensures further reliable detection of the signal light superimposed on the reflected light.

Figure 18:
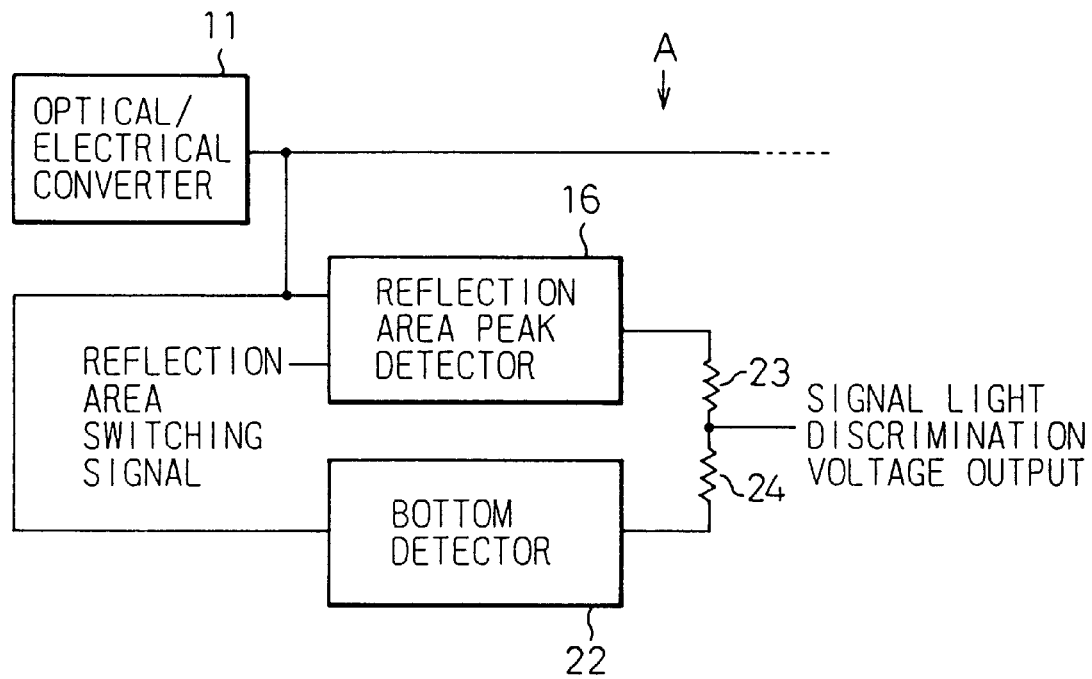
FIG. 18 is a block diagram showing a sixth embodiment of the present invention.

FIG. 18 shows a circuit configuration according to a sixth embodiment of the present invention. In the figure, the same parts as those in FIG. 13 are designated by the same reference numerals. A reflection area peak detector 16 detects a peak of the output signal of the optical-to-electrical converter 11 during the period that reflected light is being received by the master station 1, and holds the peak for a plurality of transmit/receive cycles, thereby producing a signal light discrimination voltage output.

Figure 19:
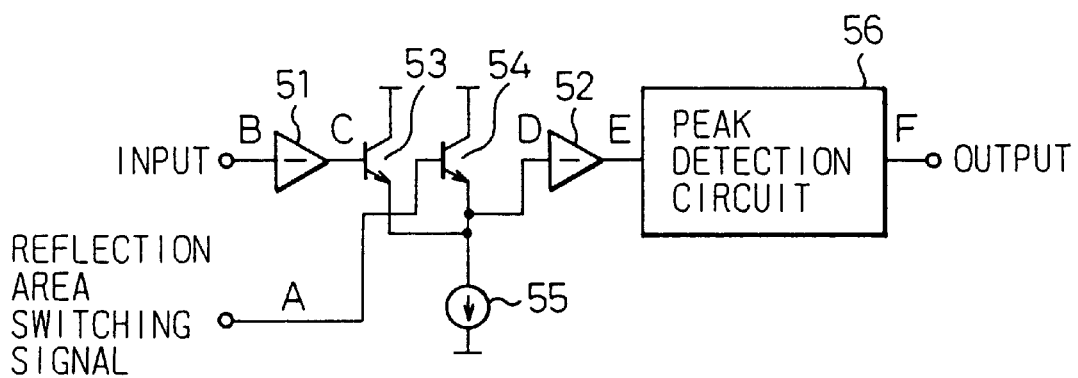
FIG. 19 is a circuit diagram showing a detailed configurational example of a reflection area peak detector.

FIG. 19 shows a configurational example of the reflection area peak detector 16. In FIG. 19, 51 and 52 are inverting circuits, 53 and 54 are transistors, 55 is a constant current source, and 56 is a peak detection circuit.

The signal shown in FIG. 20B, output from the optical-to-electrical converter 11, is inverted by the inverting circuit 51 to obtain the signal shown in FIG. 20C. This inverted signal is then fed to a circuit comprising the transistors 53, 54 and constant current source 55, where the signal is superimposed on the reflection area switching signal shown in FIG. 20A which indicates the period during which reflected light is being received by the master station 1. The resulting signal is shown in FIG. 20D. The signal of FIG. 20D is then inverted by the inverter circuit 52, and the resulting signal of FIG. 20E is applied to the peak detection circuit 56. The peak detection circuit 56 is similar in configuration to the peak detector shown in FIG. 7, but since the time constant is made sufficiently long, the peak detection circuit 56 produces an output voltage that remains almost unchanged throughout a plurality of transmit/receive cycles at the master station, as shown in FIG. 20F. The difference between this output voltage and the bottom detection voltage from the bottom detector 22 is divided through the resistors 23 and 24, to obtain the threshold voltage for signal discrimination.

In the sixth embodiment, with the provision of the reflection area peak detector 16, signal discrimination can be performed using a threshold voltage that remains almost unchanged throughout a plurality of transmit/receive cycles at the master station 1; this ensures reliable discrimination of the signal light, which is larger than reflected light, as H or L. More specifically, since the signal light discrimination voltage output (threshold voltage) is obtained that remains almost unchanged throughout a plurality of transmit/receive cycles, as shown in FIG. 21A, by discriminating the signal light based on this threshold an output can be obtained with the signal light discriminated as H or L as shown in FIG. 21B.

Figure 22:
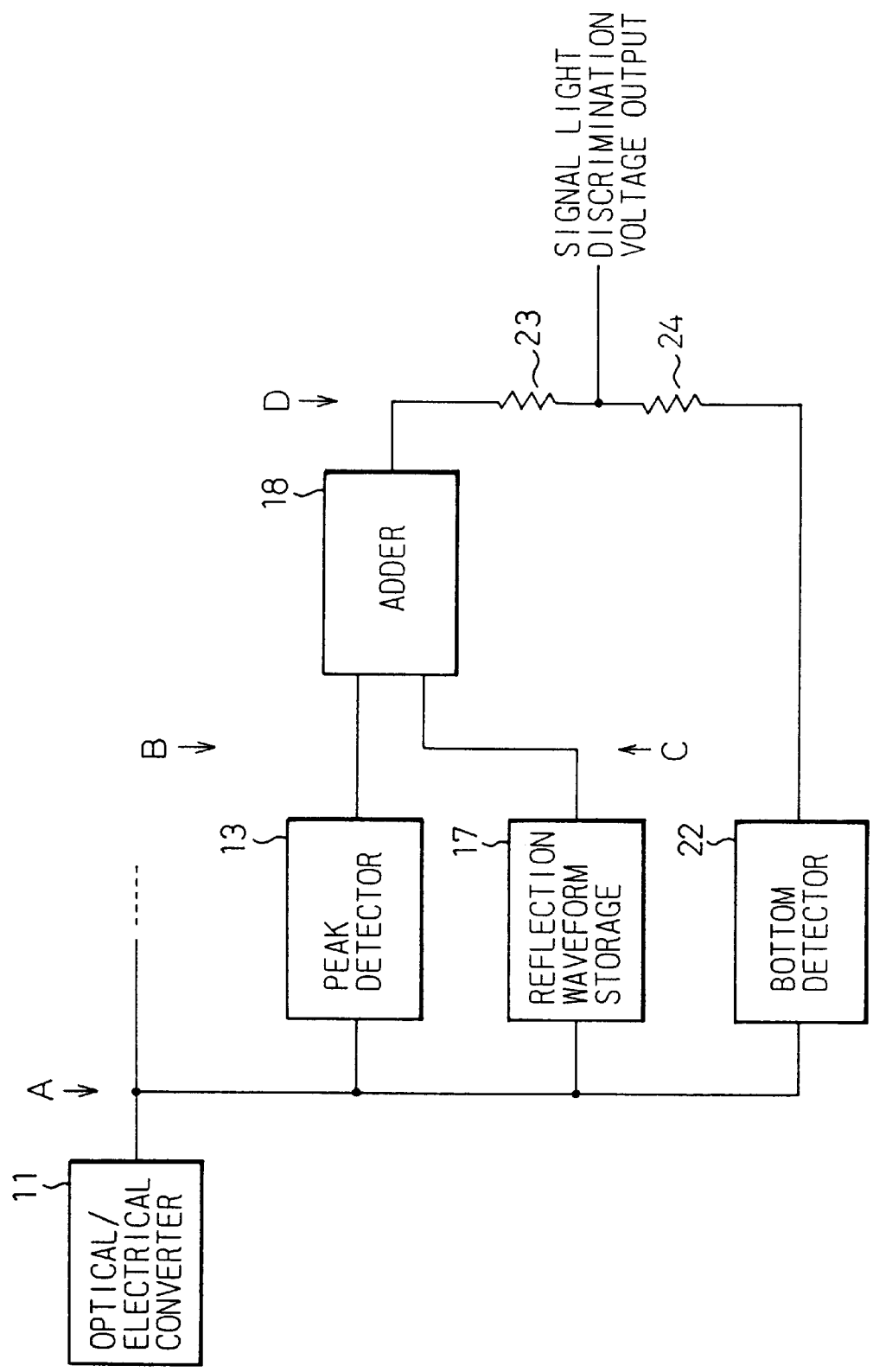
FIG. 22 is a block diagram showing a seventh embodiment of the present invention.

FIG. 22 shows a circuit configuration according to a seventh embodiment of the present invention. The same parts as those in FIG. 13 are designated by the same reference numerals, whereas reference numeral 17 is a reflection waveform storing section for storing a waveform only of reflected light not containing signal light, and 18 is an adder constructed from a known adder circuit. FIGS. 23A–23F show signal waveforms at designated points in the seventh embodiment.

The reflection waveform storing section 17 detects and stores a peak of the signal (FIG. 23C) corresponding to the waveform only of reflected light in a received optical signal (FIG. 23A) input thereto after each transmit operation at the master station. Since signal light occurring from a slave station differs for each transmit/receive cycle, contributions from the signal light are cancelled by averaging the received light signal over a plurality of cycles, and the waveform only of the reflected light can thus be obtained. The peak detector 13 detects and holds a peak voltage (FIG. 23B) of the output signal output at point A from the optical-to-electrical converter 11.

The adder 18 adds the output signal (FIG. 23C) at point C of the reflection waveform storing section 17 to the output signal (FIG. 23B) at point B of the peak detector 13, and produces an output as shown in FIG. 23D. The difference between this output and the bottom voltage is divided in the proportion of 6:10, for example, to produce the signal light discrimination voltage output indicated by the bold lines in FIG. 23D.

FIG. 23E shows the discrimination voltage indicated by the bold lines in FIG. 23D superimposed on the received optical signal shown in FIG. 23A. As can be seen from FIG. 23E, by discriminating the received optical signal using the signal light discrimination voltage output as a threshold voltage, data output can be obtained with the received light level discriminated as shown in FIG. 23F.

In the seventh embodiment, the waveform only of reflected light and the waveform of signal light containing the reflected light are added together, and a voltage slightly greater than ½ of the sum is set as a threshold voltage by which the received optical signal containing the reflected light is discriminated. This ensures reliable discrimination of the signal light.

Figure 24:
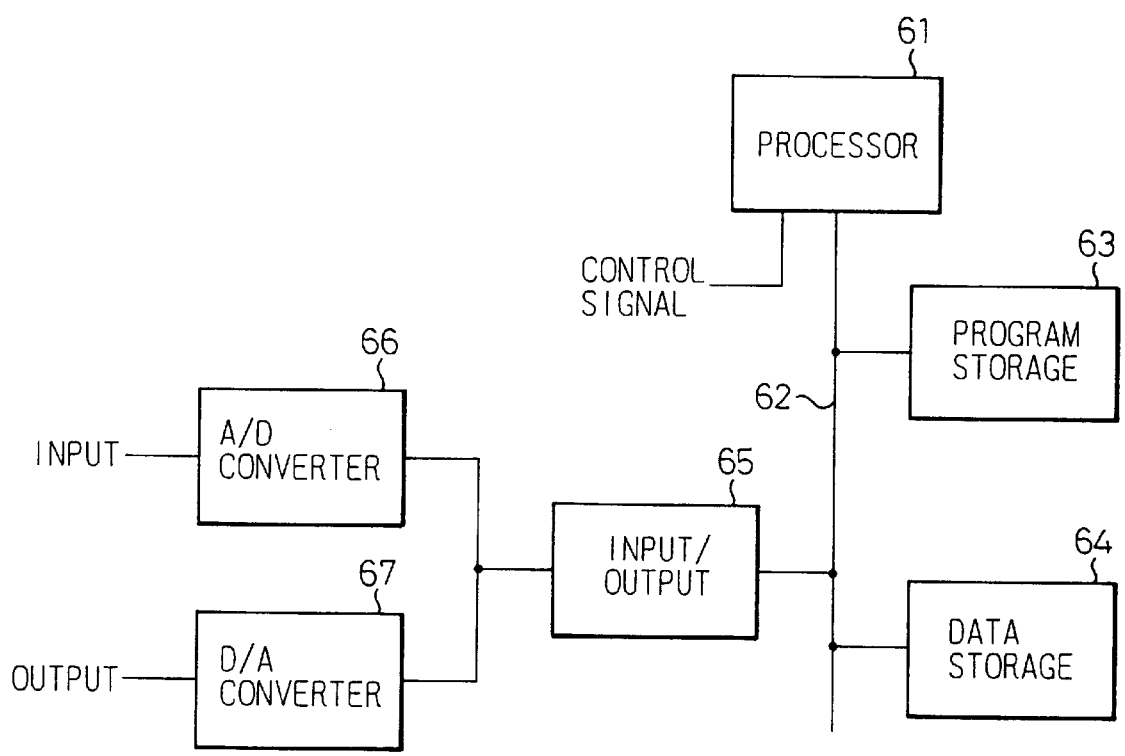
FIG. 24 is a block diagram showing a detailed configurational example of a reflection waveform storing section.

FIG. 24 shows a detailed configurational example of the reflection waveform storing section 17 of FIG. 22. In the illustrated example, a reflection waveform is stored by digital processing. In the figure, reference numeral 61 is a processor containing a microprocessor, which is configured to perform prescribed operations using the software pre-stored in a program storing section 63 connected to a bus 62. Also connected to the bus 62 is a data storing section 64 for storing data, such as data necessary for processing in the processor 61 and data of processing results.

To the bus 62 is further connected an input/output section 65 via which data is transferred to and from the outside. An analog input signal is converted by an analog-to-digital (A/D) converter 66 into digital data for input, while output data is converted by a digital-to-analog (D/A) converter 67 into an analog signal for output.

The signal output from the optical-to-electrical converter 11 is converted by the A/D converter 66 into a digital signal which is stored into the data storing section 64 in synchronism with a control signal. The stored data is averaged over a plurality of transmit/receive cycles, and the result is converted by the D/A converter 67 into an analog signal which is output as a signal representing only reflected light.

Figure 25:
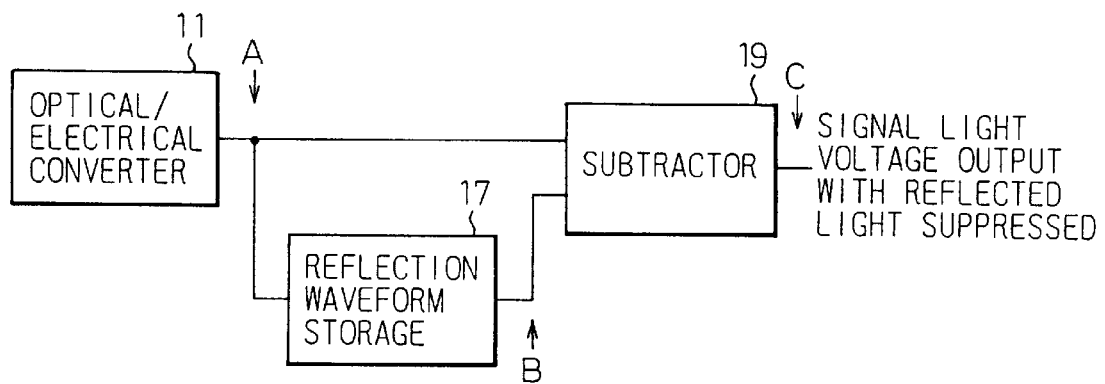
FIG. 25 is a block diagram showing an eighth embodiment of the present invention.

FIG. 25 shows a circuit configuration according to an eighth embodiment of the present invention. In the figure, the same parts as those in FIG. 22 are designated by the same reference numerals, whereas reference numeral 19 is a subtractor constructed from a known subtractor circuit.

Figure 26A:
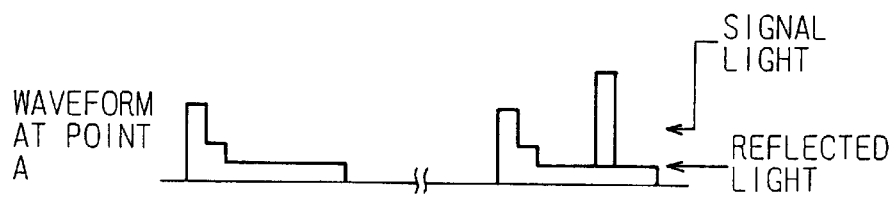
FIGS. 26A to 26C are waveform diagrams for signals at designated points in FIG. 25.
Figure 26B:
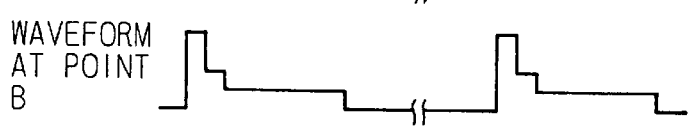
Figure 26C:
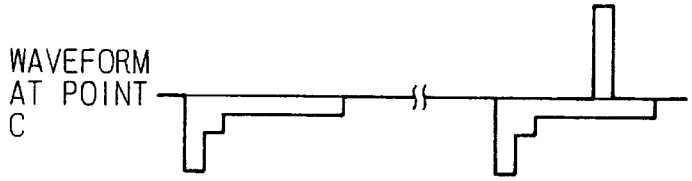

The reflection wave storing section 17, as in the seventh embodiment, detects and stores a signal corresponding to the waveform only of reflected light in a received optical signal input from the optical-to-electrical converter 11 after each transmit operation at the master station. The subtractor 19 subtracts the reflected light signal shown in FIG. 26B, output at point B from the reflection waveform storing section 17, from the received signal shown in FIG. 26A at point A, and thereby produces at point C a signal light voltage output with the reflected light suppressed.

Figure 27:
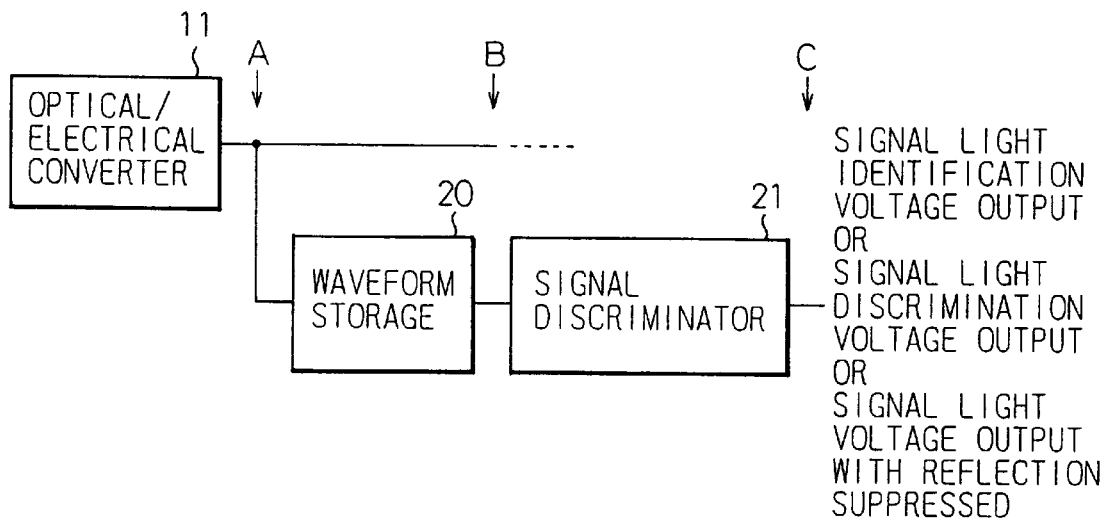
FIG. 27 is a block diagram showing a ninth embodiment of the present invention.
Figure 28A:
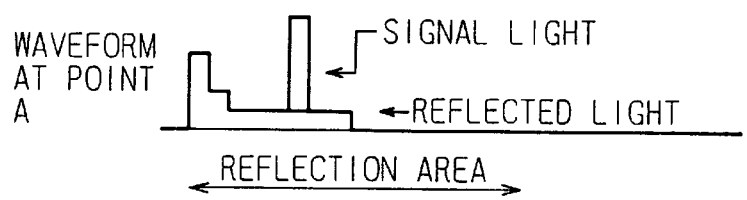
FIGS. 28A to 28C are waveform diagrams for signals at designated points in FIG. 27.
Figure 28B:
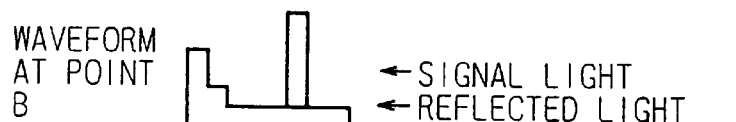
Figure 28C:

FIG. 27 and FIGS. 28A–28C concerns a ninth embodiment of the present invention. FIG. 27 shows the circuit configuration and FIGS. 28A–28C show signal waveforms at designated points. In the figure, a waveform storing section 20 stores the waveform of a received optical signal, within a reflection area, appearing at point A. A signal discriminator 21, based on known conditions for the occurrence of reflected light and signal light, detects a high level output at a position corresponding to the signal light in the waveform of the received optical signal stored in the waveform storing section 20, and produces at point C a signal light identification voltage output, or a signal light discrimination voltage output, or a signal light voltage output with suppressed reflection.

The ninth embodiment can be applied, for example, to a case where there is a signal whose time of occurrence is known in advance, such as a distance measuring response signal from the nearest slave station when measuring signal light delay times based on distance (optical fiber length) from a plurality of slave stations and thereby setting a signal transmission time from each individual slave station, to prevent collisions of signal lights from different slave stations from occurring in the received optical signal at the master station; more specifically, the temporal position of such a signal is stored in advance, and based on the stored position, the signal light is discriminated.

The waveform storing section 20 and signal discriminator 21 of the ninth embodiment can be implemented using the same configuration as that of the reflection waveform storing section shown in FIG. 24. In the ninth embodiment, the processor 61 is supplied with a reflection area indicating signal as a control signal, in synchronism with which the waveform of the received optical signal within a reflection area in the output of the optical-to-electrical converter 11 supplied via the A/D converter 66 is stored into the data storing section 64.

On the other hand, the known conditions for the occurrence of reflected light and signal light are also held in the data storing section 64; therefore, the processor 61 compares the waveform of the received optical signal within the reflection area with the conditions for the occurrence of reflected light and signal light, and detects a high level output at the position corresponding to the signal light. This output is converted by the D/A converter 67 into an analog signal, thereby producing a signal light discrimination voltage output or a similar output.

Figure 29:
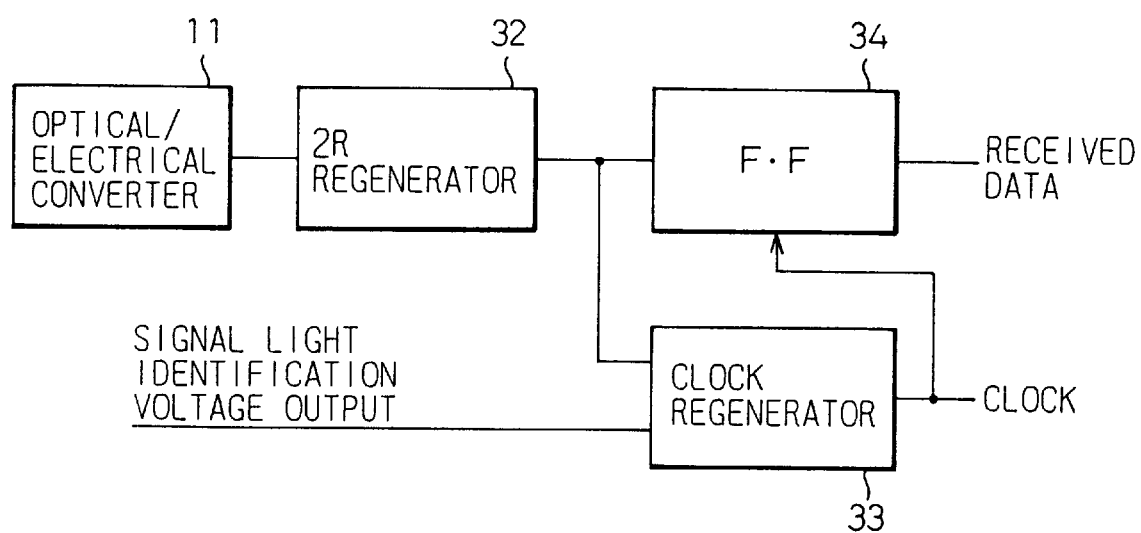
FIG. 29 is a diagram showing a configurational example of a receiver circuit.

FIG. 29 illustrates the configuration of a receiver circuit for reproducing received data by using the signal light identification voltage that the circuit of the invention outputs. In the figure, reference numeral 32 is a 2R regenerator for performing 2R regeneration, 33 is a clock regenerator for regenerating clock pulses from an input signal, and 34 is a flip-flop (F.F.) for retiming input data.

The 2R regenerator applies known reshaping and pulse regeneration to an electrical signal output from the optical-to-electrical converter 11, and generates a binary signal output. The clock regenerator 33 generates clock pulses in synchronism with the output signal of the 2R regenerator 32; at this time, the clock regenerator 33 is once reset by the rising edge of the signal light identification voltage output, and then locked again for new clock generation. The flip-flop 34 retimes the output signal of the 2R regenerator 32 with the clock pulses generated by the clock regenerator 33, and thus generates the received data.

Before the clock regenerator 33 becomes locked with the signal light identification voltage output, the received data cannot be reproduced correctly since the generated clock pulses are not synchronized to the signal light; however, once the clock regenerator 33 is locked with the signal light identification voltage output, the generated clock pulses are synchronized to the signal light and the received data can be reproduced correctly.

I claim:

1. In bidirectional optical burst transmission performed between a master station and at least one slave station using a single optical fiber, a method of generating a signal light identification voltage output that signifies the beginning of signal light transmitted from the slave station and that is used to identify the signal light, the signal light being included in a received optical signal that is received at the master station and that contains a reflection of an optical signal sent out from the master station, comprising the steps of:

converting the received optical signal into a received electrical signal;

comparing the received electrical signal with a prescribed reference voltage to generate the signal light identification voltage output;

generating a retiming clock signal based on the received electrical signal, and resetting the clock generation by the signal light identification voltage output.

2. In bidirectional optical burst transmission performed between a master station and at least one slave station using a single light identification voltage output that signifies the beginning of signal light transmitted from the slave station and that is used to identify the signal light, the signal light being included in a received optical signal that is received at the master station and that contains a reflection of an optical signal sent out from the master station, comprising the steps of:

converting the received optical signal into a received electrical signal;

comparing the received electrical signal with a prescribed reference voltage to generate the signal light identification voltage output, and smoothing the signal light identification voltage output by holding a peak value of a comparison result obtained in the comparing step.

3. In bidirectional optical burst transmission performed between a master station and at least one slave station using a single light identification voltage output that signifies the beginning of signal light transmitted from the slave station and that is used to identify the signal light, the signal light being included in a received optical signal that is received at the master station and that contains a reflection of an optical signal sent out from the master station, comprising the steps of:

converting the received optical signal into a received electrical signal;

comparing the received electrical signal with a prescribed reference voltage to generate the signal light identification voltage output; and holding a peak value of the electrical signal before the comparing step.

4. A method according to claim 3, further comprising the step of differentiating the smoothed electrical signal before the comparing step.

5. In bidirectional optical burst transmission performed between a master station and at least one slave station using a single optical fiber, a method of generating a signal light discrimination voltage output for discriminating signal light transmitted from the slave station, the signal light being included in a received optical signal that is received at the master station and that contains a reflection of an optical signal sent out from the master station, comprising the steps of:

converting the received optical signal into a received electrical signal;

holding a peak value voltage of the received electrical signal with a first time constant;

holding a bottom value voltage of the received electrical signal with a second time constant; and generating, from the peak value voltage and the bottom value voltage, a voltage intermediate therebetween as the signal light discrimination voltage output.

6. A method according to claim 5, further comprising the step of adding a pulse based on the differential of a transmit-receive switching signal signifying switching from a transmitting state to a receiving state at the master station, wherein, in the step of holding the peak value voltage, the peak value voltage of the received electrical signal with the pulse added thereto is held.

7. A method according to claim 5, wherein, in the step of holding the peak value voltage, the peak value voltage of the received electrical signal during a reflection appearance period is held.

8. A method according to claim 5, further comprising the steps of detecting a waveform only of reflected light from the received electrical signal and storing the waveform, and adding the stored waveform of the reflected light to the peak value voltage, wherein, in the generating step, the signal light discrimination voltage output is generated by using the peak value voltage, with the reflected light waveform added thereto, as the peak value voltage.

9. In bidirectional optical burst transmission performed between a master station and at least one slave station using a single optical fiber, a method of generating a signal light voltage output with reflected light suppressed in order to identify signal light transmitted from the slave station, the signal light being included in a received optical signal that is received at the master station and that contains a reflection of an optical signal sent out from the master station, comprising the steps of:

converting the received optical signal into a received electrical signal;

detecting a waveform only of the reflected light from the received electrical signal and storing the waveform; and generating the signal light voltage output with reflected light suppressed, by subtracting the stored waveform of the reflected light from the received electrical signal.

10. In bidirectional optical burst transmission performed between a master station and at least one slave station using a single optical fiber, an apparatus for generating a signal light identification voltage output that signifies the beginning of signal light transmitted from the slave station and that is used to identify the signal light, the signal light being included in a received optical signal that is received at the master station and that contains a reflection of an optical signal sent out from the master station, comprising:

an optical-to-electrical converter for converting the received optical signal into a received electrical signal;

a comparator for comparing the received electrical signal with a prescribed reference voltage, to generate the signal light identification voltage output; and a clock regenerator for generating a retiming clock signal based on the received electrical signal, wherein the clock regenerator is reset by the signal light identification voltage output.

11. In bidirectional optical burst transmission performed between a master station and at least one slave station using a single light identification voltage output that signifies the beginning of signal light transmitted from the slave station and that is used to identify the signal light, the signal light being included in a received optical signal that is received at the master station and that contains a reflection of an optical signal sent out from the master station, comprising:

an optical-to-electrical converter for converting the received optical signal into a received electrical signal;

a comparator for comparing the received electrical signal with a prescribed reference voltage to generate the signal light identification voltage output; and a peak detector for smoothing the signal light identification voltage output by holding a peak value of a comparison result fed from the comparator.

12. In bidirectional optical burst transmission performed between a master station and at least one slave station using a single light identification voltage output that signifies the beginning of signal light transmitted from the slave station and that is used to identify the signal light, the signal light being included in a received optical signal that is received at the master station and that contains a reflection of an optical signal sent out from the master station, comprising:

an optical-to-electrical converter for converting the received optical signal into a received electrical signal;

a comparator for comparing the received electrical signal with a prescribed reference voltage, to generate the signal light identification voltage output; and a peak detector for holding a peak value of the received electrical signal and thereby smoothing the electrical signal before the comparison in the comparator.

13. An apparatus according to claim 12, further comprising a differentiator for differentiating the electrical signal smoothed by the peak detector, before the comparison in the comparator.

14. In bidirectional optical burst transmission performed between a master station and at least one slave station using a single optical fiber, an apparatus for generating a signal light discrimination voltage output for discriminating signal light transmitted from the slave station, the signal light being included in a received optical signal that is received at the master station and that contains a reflection of an optical signal sent out from the master station, comprising:

an optical-to-electrical converter for converting the received optical signal into a received electrical signal;

a peak detector for holding a peak value voltage of the received electrical signal with a first time constant;

a bottom detector for holding a bottom value voltage of the received electrical signal with a second time constant; and a voltage dividing circuit for generating, from the peak value voltage and the bottom value voltage, a voltage intermediate therebetween as the signal light discrimination voltage output.

15. An apparatus according to claim 14, further comprising a charge voltage adder for adding a pulse based on the differential of a transmit-receive switching signal signifying switching from a transmitting state to a receiving state at the master station, wherein the peak detector holds the peak value voltage of the received electrical signal with the pulse added thereto.

16. An apparatus according to claim 14, wherein the peak detector holds the peak value voltage of the received electrical signal during a reflection appearance period.

17. An apparatus according to claim 14, further comprising a reflection waveform storing section for detecting a waveform only of reflected light from the received electrical signal, and for storing the waveform, and an adder for adding the stored waveform of the reflected light to the peak value voltage, and for supplying the resulting sum as the peak value voltage to the voltage dividing circuit.

18. In bidirectional optical burst transmission performed between a master station and at least one slave station using a single optical fiber, an apparatus for generating a signal light voltage with reflected light suppressed in order to identify signal light transmitted from the slave station, the signal light being included in a received optical signal that is received at the master station and that contains a reflection of an optical signal sent out from the master station, comprising:

an optical-to-electrical converter for converting the received optical signal into a received electrical signal;

a reflection waveform storing section for detecting a waveform only of the reflected light from the received electrical signal, and for storing the waveform; and a subtractor for generating the signal light voltage output with reflected light suppressed, by subtracting the stored waveform of the reflected light from the received electrical signal.

* * * * *